IONOSPHERE SOUNDER SYSTEM

Filed Jan. 25, 1965 3 Sheets-Sheet 1

INVENTOR.
RAYMOND D. EGAN
BY
Fleher & Swan
ATTORNEYS

Feb. 10, 1970 R. D. EGAN 3,495,176

IONOSPHERE SOUNDER SYSTEM

Filed Jan. 25, 1965 3 Sheets-Sheet 2

INVENTOR.
RAYMOND D. EGAN

BY

Fleh & Swain
ATTORNEYS

INVENTOR.
RAYMOND D. EGAN
BY
Fleha & Swain
ATTORNEYS

United States Patent Office 3,495,176

Patented Feb. 10, 1970

3,495,176

IONOSPHERE SOUNDER SYSTEM

Raymond D. Egan, Palo Alto, Calif., assignor to Granger Associates, Palo Alto, Calif., a corporation of California Filed Jan. 25, 1965, Ser. No. 427,556

Int. Cl. H04b 1/06

U.S. Cl. 325—67 7 Claims

ABSTRACT OF THE DISCLOSURE

An ionosphere sounding system having a receiver which digitizes and stores the peak amplitude information which is received in video form and provides a permanent record of this amplitude information in decimal form via a teletype machine which has a format including columns for a frequency through which the transmitter scans with a separate line for each scan of the transmitter and successive lines for recording successive scans of the transmitter. The above format also indicates excessive multipath and noise in any given frequency channel.

This invention relates generally to an ionosphere sounder system and more particularly to a receiver for such a system.

In point-to-point high frequency communications circuits, propagation uncertainties may arise because of atmospheric conditions, interferences and the like. The optimum communication frequency may also change as a function of time. There has been developed so-called ionosphere sounders to provide information regarding propagation uncertainties, propagation parameters and optimum frequency changes.

Generally, ionosphere sounder systems comprise a transmitter which transmits over the same transmission path as the communication path and which is scanned through the frequency range of interest. The scanning is generally over a number of frequency bands and frequency channels in the range of interest. A receiver is provided for receiving the transmitted signal. Terminal equipment provides information with respect to the propagation parameters as a function of a frequency, so that transmission can be optimized.

Such a system as the above is described in a copending application Ser. No. 386,902 entitled "Ionosphere Sounder System" by David S. Pratt and assigned to the present assignee and is shown in FIGURE 5.

Since the purpose of sounding systems is to give information regarding the communication circuit parameters, the type of readout of the receiver is very critical. In the past, one type of display device which has been widely utilized is a storage tube display. The horizontal axis of the storage tube provided frequency information, the left and right limits of the illuminated display indicating the lowest observed frequency [LOF] and the maximum observed frequency [MOF], respectively. The vertical axis gives an indication of the multipath distortion. Actually, the percent distortion is related to the differential time delay which the signal incurs in going through the atmosphere. The received signal amplitude information is indicated by the intensity of the cathode ray tube trace. In another type of display, the information is recorded in a similar manner on paper by an electrostatic printer.

In order to fully utilize the capabilities and information provided by a sounding system, it is necesary that the processed information be given to the operator of a radio system as rapidly as possible. In the case of storage tube displays and electrostatic print outs, this information can only be transferred to the operator of a distant station by either expensive or time consuming means.

It is thus an object of the present invention to provide an ionosphere sounder receiver having a data processing device which is capable of reliably and economically transmitting the information output of the receiver to several different locations.

It is yet another object of the invention to provide an improved receiver which processes received signal information and converts it so that it may be displayed in a direct and easy-to-read and interpret format.

It is another object of the invention to provide an improved receiver which provides a digitized output signal, the digits representing the peak amplitude of signal pulses.

It is still a more specific object of the invention to provide a receiver which converts analog signal information to digital information suitable for utilizaton by a standard teletype machine.

It is a further object of the invention to provide a receiver which includes means for detecting the peak amplitude of a received signal pulse and is responsive to a threshold level to prevent an output signal from being produced by the system if the peak amplitude is less than such threshold level.

It is yet another object of the invention to provide a receiver which produces a printed record having a format of columns for the frequencies through which the transmitter scans, a separate line for each scan of the transmitter, and successive lines for recording successive scans.

These and other objects of the invention will become more clearly apparent from the following description.

Referring to the drawings.

There are several different data which are valuable to the communicator in providing him with a basis for predicting the propagation conditions on his radio transmitting circuits. A teletype representation of such data, which has been obtained by the novel receiver of the present invention, is illustrated in part in FIGURE 4.

Figures 4, 5:
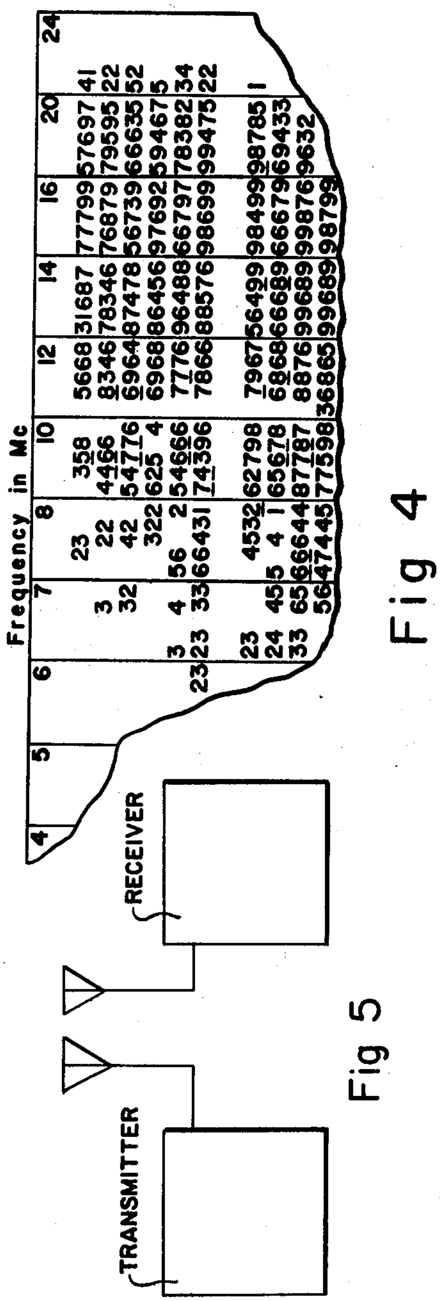
FIGURE 4 is a representation of a portion of the printed output of the invention.
FIGURE 5 is a block diagram of an ionosphere sounder system embodying the present invention.

Specifically, FIGURE 4 is a portion of the output of the receiver which was produced on a teletype page printer. The horizontal axis of the diagram indicates frequency in megacycles. Within each major frequency division, there are five subfrequencies represented which are substantially equally spaced, for example, in the case of 10 megacycles from 9 to 11 megacycles. Each horizontal line depicts a single sounder scan which was taken at one time period, the next or successive horizontal line being taken at, for example, a ten minute interval later. In the portion of the output diagram shown, the first six horizontal lines of numbers indicate an hour, the sounder scanning in ten minute intervals. A line is skipped to indicate the starting of a second hour. The digits themselves on the diagram run from between 1 and 9 and are proportional to the received signal strength on a decibel basis. No digit is recorded if the noise rises above a minimum threshold, the printer skipping a space. The digit which is furthest to the left represents the lowest observed frequency [LOF] and to the right, the maximum observed frequency [MOF]. Thus, in the diagram of FIGURE 4, the lowest operating frequency in the first scan period would be about 8 megacycles. Lastly, multipath distortion in excess of an allowable threshold is indicated by underscoring the digit representing the signal strength.

A circuit to convert and process the incoming received signal pulse to the Teletype machine format, as shown above, is illustrated in FIGURES 1 and 2, the input signal pulse being a video signal which may, for example, be generated in the receiver of the above mentioned patent application.

Figure 3:
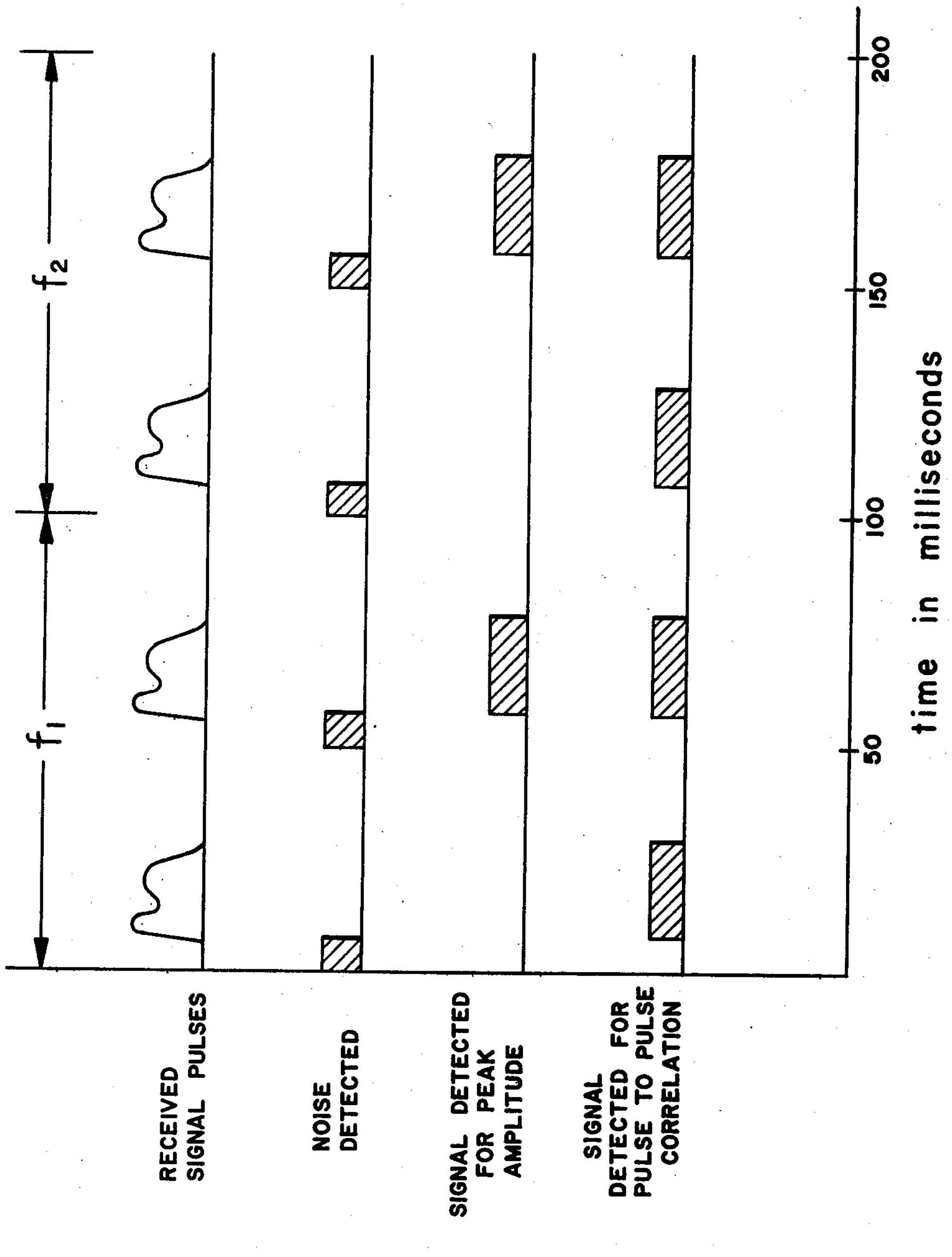
FIGURE 3 is a diagram relating various operations of the invention to time.

Before describing the detailed schematic diagram of the inventive system, it is appropriate to first discuss the type of pulse repetition periods which the sounder-receiver utilizes. As illustrated in FIGURE 3, each frequency channel includes two pulse repetition periods. Each period is 50 milliseconds long: the first 4 milliseconds are for detection of noise; the succeeding 16 milliseconds are a signal transmission period; and the remaining 30 milliseconds are a space. The first and second pulse periods of a given frequency channel are for noise detection and the second period for sampling the peak amplitude of the signal. In addition, the signal is also sampled in each of the two periods of a single frequency channel in order to establish the presence of a signal greater than a noise threshold level in both pulse periods. This pulse to pulse correlation excludes random noise and no output information is produced unless a signal is detected in both pulse periods.

Another feature of the invention is that of channel pairing of two adjacent and different frequency channels. More specifically, the pulse from one frequency channel is compared to the detected pulse from the next succeeding frequency channel, the higher valued pulse peak amplitude being the one used as output. This compensates for fading which may occur periodically and the channel pairing by selecting the higher valued peak amplitude yields information as to the average signal level, which is the important signal characteristic for transmission. Fading merely causes a momentary decrease in signal strength and is compensated for in a communications system by providing a diversity communications channel. Channel pairing also provides a sufficient degree of information redundancy to greatly suppress printing omissions due to received interference on sounder channels.

Figure 1:
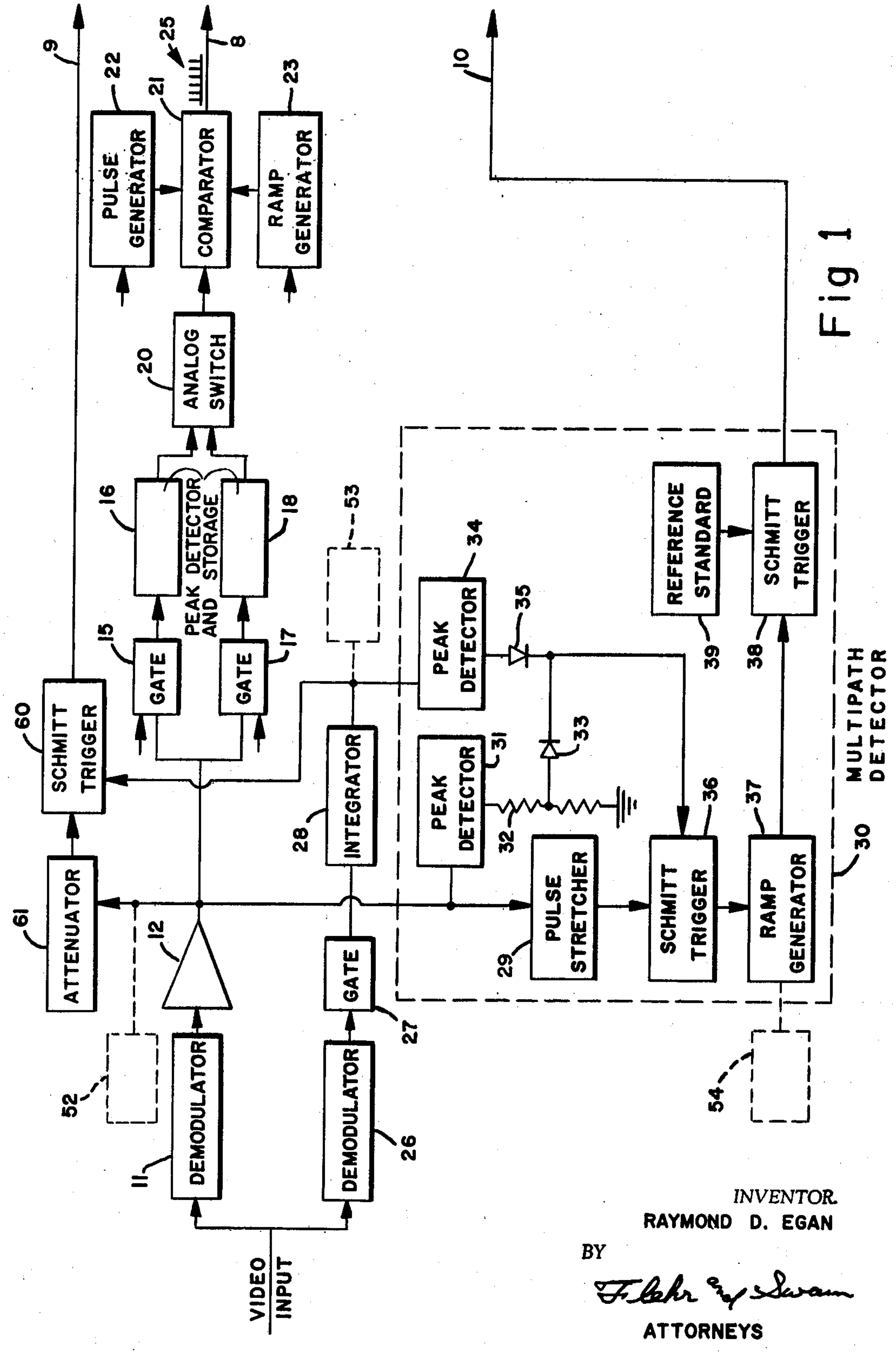
FIGURE 1 is a schematic block diagram of a portion of a receiver constructed in accordance with the invention.

Referring now to the signal information processor in FIGURE 1, from an overall viewpoint, this processor receives a video signal of the type indicated in FIGURE 3 which is the typical output of prior art receivers as discussed above and processes such signal to yield three outputs. In the signal represented, the horizontal axis represents time and the vertical axis signal amplitude. Multipath distortion is, of course, indicated by the time length of the received signal compared to the pulse width of the originally transmitted signal. For example, the combination of a signal propagated with a single ionospheric reflection and one propagated with two ionospheric reflections and an intervening ground reflection will produce a received signal of relatively longer duration (longer pulse width), the time length extension representing multipath distortion.

The major output 8 of the processor is a digitized representation of the peak amplitude of the received signal pulse. The second output 9 is an indication of whether there has been pulse to pulse correlation; that is, whether for one frequency channel there has been a signal pulse in each of the two pulse periods. The third output 10 is a "yes-no" circuit which indicates whether a predetermined multipath distortion level has been exceeded.

Means for detecting the peak amplitudes of the received signal pulse includes a demodulator 11 coupled to an amplifier 12. The amplifier may include a low pass filter to reduce the amplitude of noise spikes.

Amplifier 12 is connected to two parallel circuits, each of which includes a series connected gate and a storage device. These circuits are an essential part of the signal pairing means discussed above which compare the outputs of adjacent frequency channels to produce a final output signal if a single output is present in either frequency channel.

Specifically, the circuits which include gate 15 and storage device 16 are gated to respond and store a signal from a first frequency channel; gate 17 and storage device 18 respond only to an adjacent frequency channel which, of course, occurs at a later time interval.

Means for providing timed gating signals to the gates 15 and 17 have been omitted for simplicity. It is apparent, however, that such means could be easily synchronized with the received whereby to provide gating pulses at the appropriate time for passing the first and then the second signal to the first and second storage means 16 and 18, respectively. In addition, storage units 16 and 18 also detect the peak amplitude of the signal pulses. This detection occurs only during the second pulse repetition period of a frequency channel as shown in FIGURE 3. For increased noise immunity storage means 16 to 18 are also responsive to the pulse to pulse correlation indication on lead 9, for dumping any storage to zero when correlation does not occur for the frequency channel corresponding to the storage means.

The stored signals in devices 16 and 18 are both coupled to an analog switch 20 (which may consist of an "OR" type computer component) which performs the frequency channel pairing function by switching the signal having the higher amplitude (or the sole signal if that is the case) to a device which digitizes the signal.

More particularly, the analog to digital converter includes a comparator 21 coupled to a pulse generator 22 and a ramp generator 23. As analog switch 20 relays the peak signal amplitude information or signal to comparator 21, pulse generator 21 is activated by a timing input (not shown) to start the production of pulses. Ramp generator 23 serves as a reference standard and is activated simultaneously with pulse generator 22. Comparator 21 produces pulses, as illustrated by sketch 25, on output lead 8 until the level of voltage generated by ramp generator 23 reaches the magnitude of the peak amplitude input of switch 20. Thus, the number of pulses produced is a digital representation of the peak amplitude of the received sounder signal.

Means are provided for sampling each of the frequency channels to detect the noise level associated with such channel. These means include demodulator 26 coupled to a gate 27 which, in turn, is coupled to a noise integrator 28. The output of demodulator 26 is fed to a gate 27 which opens in response to a gating signal during the first 4 milliseconds of each pulse repetition period of a frequency channel as discussed previously. During this 4 millisecond period there is, of course, no signal present and the output of gate 27 is integrated by noise integrator 28 to establish a noise level. Such level is used both in the detection and measurement of multipath distortion which is indicated on output 10 and also in the pulse to pulse correlation of output 9.

Referring first to the multipath circuitry, a multipath detector 30 is coupled to the output of amplifier 12 to constitute a portion of means for detecting the time length of the received signal pulse. Time length is, of course, an indication of multipath distortion since the greater the number of propagation modes skips, the longer a time period will be seen on the received signal pulse. In fact, the dip or saddle in the center of the pulse illustrated is caused by a multipath signal. In determining the time length of the signal, an amplitude point is picked which will give a fair representation of the signal pulse length. If too low an amplitude is chosen, the noise level could be above this amplitude and an erroneous indication would result since the time length of the noise instead of the signal would be measured. On the other hand, if the time length is measured too near the peak amplitude of the signal, one or more of the multipath signals could be missed because of its lower amplitude.

In accordance with the invention, multipath detector 30 includes means for regulating the amplitude at which multipath is measured by use of either a normal threshold device or a minimum threshold device. The normal threshold device includes a peak detector 31 which is coupled to the output of signal amplifier 12 and which detects the peak amplitude of the incoming signal. A voltage divider network 32 coupled to the output of detector 31 in conjunction with diode 33 placed at a predetermined point on the voltage divider 32 produces a threshold level at the output of the diode which is a predetermined number of decibels below the peak amplitude; for example, ten decibels has been used successfully.

The minimum threshold device includes a peak detector 34 coupled to integrator 28 for detecting the peak amplitude of the integrated noise signal. A diode 25 is connected to the output of detector 34 and its other terminal is coupled to the output of diode 33. The joined outputs of diodes 33, 35 in essence form an "OR" type computer component such that the output of the common lead will be the highest voltage present at either diode. This output is coupled to a Schmitt trigger 36 and provides a reference level for the trigger for determining its firing point. The input of the trigger 36 is coupled to signal amplifier 12 through a pulse stretcher 29 whose function will be described below. The output of trigger 36 is coupled to a ramp generator 37 which in turn is coupled to another Schmitt trigger 38 whose firing level is regulated by a reference standard 39 and whose output is the multipath indicating lead 10.

In operation, the multipath detector receives a signal from amplifier 12 which after being processed by pulse stretcher 29 is fed to Schmitt trigger 36. The amplitude level of the signal at which the time length is measured is determined, of course, by the reference level of the trigger device 36 which level is provided through normal and minimum threshold devices 31–35. Thus, normally the reference level will be determined by normal threshold device 31–33 which has a level a predetermined number of decibels below the peak amplitude of the signal. However, where the signal is relatively weak, minimum threshold device 34, 35 will override the normal threshold level by back biasing diode 33. In summary, the multipath detector 30 is regulated in its time measurement by either the normal or minimum threshold devices, whichever yields the higher threshold.

The time length during which the Schmitt trigger 36 is closed is measured by ramp generator 37, the maximum amplitude which the ramp function reaches being proportionate to the multipath time length. This ramp function serves as the input to Schmitt trigger 38 whose reference or firing level is determined by reference standard 39 which is in essence a distortion reference system whose reference level depends on the type of communications circuit which the sounding system is to service. For example, it has been found that in a communications system utilizing Teletype printers operating at a 75 baud rate, that the allowed distortion for acceptable errors is 20%. Thus, if the time length detected by multipath detector 30 exceeds this percentage which has been set into reference standard 39, a pulse is sent out over output 10; if it falls below the level, no indication is given. In actual practice, the reference standard may be simple potentiometer device.

Reference standard 39 also must compensate for the distortions of signal time length which are due to the pulse width of the transmitted signal, the pulse stretching of device 37, and the fact that the receiver circuits have a frequency bandwidth limitation which causes a stretching of the signal.

Multipath detector 30 also includes pulse stretcher 29 for compensating for the momentary gap in the received pulse as indicated by the received signal in FIGURE 3 which is caused by multipath transmission. Without such a preventative measure, the detector could possibly measure the time length of only the directly communicated pulse which would, of course, be quite short and thus produce an erroneous acceptable distortion level indication in the system. The pulse stretcher circuit included in multipath detector 30 may be of standard construction such as a diode feeding a capacitor which charges up very rapidly but is discharged quite slowly through a relatively large resistance, which circuit tends to maintain the signal at its peak amplitude or just slightly below.

Referring finally to the pulse to pulse correlation which has an output on lead 9 and which is for the purpose of compensating for random noise in the circuit, means are provided which are responsive to the noise level produced at the output of noise integrator 28 for establishing a threshold level. Specifically, the means include a Schmitt trigger device 60 which is coupled to noise integrator 28. The peak output of such integrator determines the reference level at which the trigger device fires. The input signal is coupled to trigger device 60 through an attenuator 61 which attenuates the signal by an amount equal to the desired difference between the peak signal amplitude and the ambient noise level. Thus, a threshold level is established by means of the attenuator and Schmitt trigger.

In operation, the Schmitt trigger has its firing reference level controlled by the noise level and when this is overcome by the attenuated signal from device 61 the trigger fires producing a signal pulse over lead 9. If the attenuated peak amplitude of the signal is below the firing reference level, no indication is given over output lead 9.

As discussed above, for a single frequency channel, there are two pulse repetition periods and thus for each frequency, the normal output of trigger device 60 will be two pulses indicating that an acceptable signal on both channels. If the noise level is too great for either one of the two received signal pulses, no pulse indication will be produced on output 9 for that signal pulse and thus, there will be no pulse to pulse correlation and this will serve to prevent the production of an output digit by the signal processor, the excess noise being indicated on the printed output by a skipped space. This procedure will be described below in conjunction with FIGURE 2.

Figure 2:
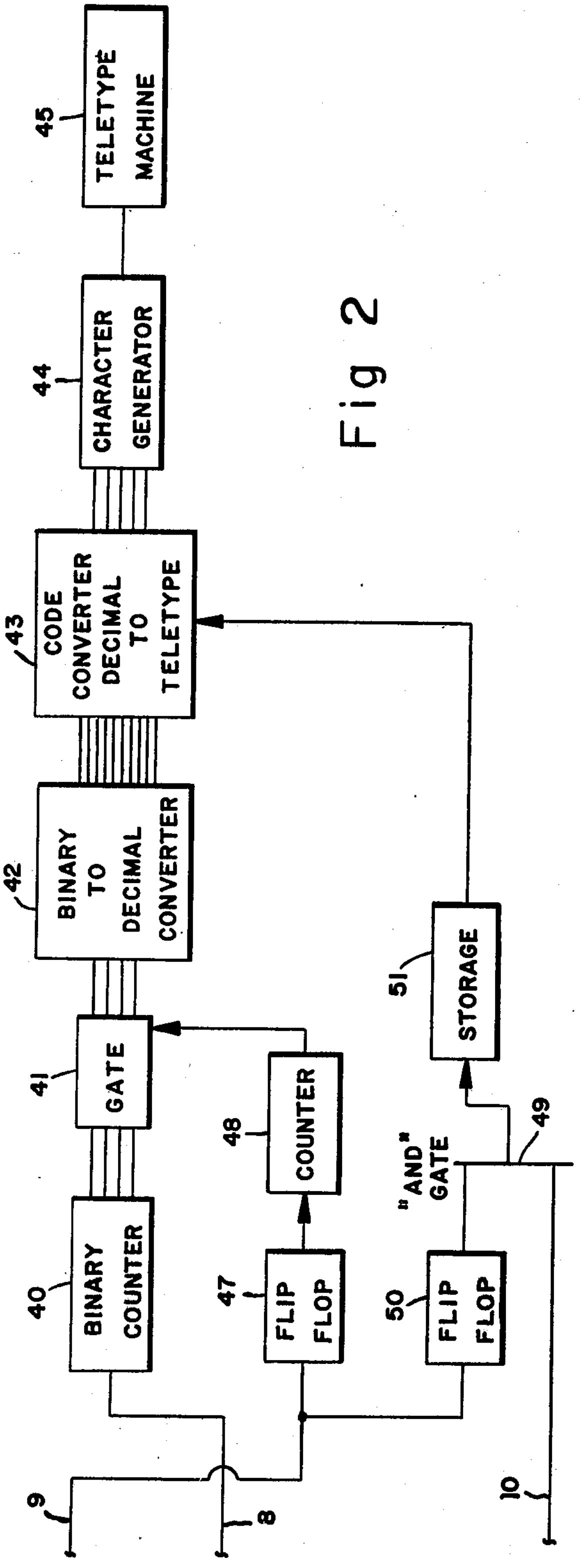
FIGURE 2 is a schematic block diagram of a further portion of the above receiver.

In FIGURE 2, the three output signals shown in FIGURE 1 (that is, the digitized signal peak amplitude output 8, the pulse correlation output 9, and the multipath threshold output 10) are fed to an encoder device illustrated in FIGURE 2 which processes the three signals and converts them to a format suitable for a Teletype machine.

The output pulses on lead 8, indicated by the waveform 25, are counted by a binary counter 40 which converts the pulses which are indicative of peak amplitude of the signal to binary information which is, by means of the four leads shown, coupled to a gate 41 and thereafter to a converter 42 which changes the binary information to decimal. However, since a Teletype machine is responsive ordinarily to a 5 bit code, the decimal information is coupled from converter 42 to a decimal to Teletype code converter 43 which produces the Teletype code on its five output leads and couples it to a Teletype character generator 44 which converts the parallel output of the converter 43 to a serial output which is then coupled into the Teletype machine 45. All of the above converters and circuits 40–45 are, of course, well known in the art and thus have not been discussed in detail.

Means for preventing the output of a digit by the Teletype character generator 44 in the case where the peak amplitude of the signal is less than the threshold level includes a flip-flop circuit 47 which is connected to a counter 48, both of which are interposed between gate 41 and pulse to pulse correlation output lead 9. The purpose of counter 48 is to detect the presence of two pulses on lead 9 which give a positive indication that an acceptable signal was present in both pulse repetition periods of a single frequency channel. If counter 48 does not count two pulses, it sends a negative indication to gate 41 causing it to prevent the transmission of binary information to converter 42. Since the converter is normally reset to "zero" this will be transmitted to the character generator 44 to cause machine 45 to skip a space.

In operation, since the flip-flop circuit 47 is of the bistable type, it recognizes only one pulse until reset. The purpose of the flip-flop is to prevent noise spikes from actuating counter 48 during a pulse repetition period. Provision is made to reset the flip-flop circuit 47 after a one pulse repetition period so that it is ready to receive the second pulse which normally occurs for the second period of a single frequency channel. The reset circuit has not been shown for simplicity. Thus, counter 48, in combination with gate 41, trigger 60 and attenuator 61, serves as means to prevent the production of an output digit if the peak amplitude is less than a predetermined threshold level which is determined, in turn, by the noise level.

Finally, the third output of the processor of FIGURE 1 on lead 10 is the multipath indication where if the multipath level is above a predetermined distortion level, a pulse is sent out over lead 10. The means for modifying the output signal to indicate such multipath distortion (a time length of the signal greater than a predetermined time length) includes, in addition to multipath detector 30, and "and" gate 49 which has one of its "and" inputs coupled to lead 10 and the other "and" input coupled to pulse to pulse correlation output 9 through a flip-flop circuit 50 similar to flip-flop 47. The output of the "and" gate 49 is coupled to a multipath storage unit 51 which, in turn, is connected to the decimal to Teletype code converter 43.

In operation, the "and" gate, of course, requires the presence of signals on both inputs in order to produce an output indication. The input from flip-flop 50 and from pluse to pulse correlation circuit 9 indicates whether or not an acceptable signal has been received and thus whether a multipath indication should be printed out. If that is the case, then an excessive multipath indication on output 10 closes the "and" gate to store such indication in multipath storage device 51 which, in turn, modifies the Teletype code produced by converter 43 to, for example as discussed above, underline the peak amplitude information digit. Of course, other modes of multipath distortion indication can be utilized such as an arrow being printed out which itself indicates excessive multipath distortion, the angular orientation of the arrow indication the numerical magnitude of the peak amplitude of the received signal.

In addition to the Teletype character generator 44 feeding the Teletype machine, there are appropriate circuits for control of the machine carriage such as line feed, carriage return and figures shifts which are all conventional in the art. Also, a minute 59 signal marks the hour and calls it a line feed as explained in conjunction with the output diagram discussed above.

Also, in conjunction with the circuit of both FIGURES 1 and 2, additional gating may be utilized such as timing gates to indicate when the signal should be received in order to increase noise immunity.

In the case where the information contained in the receiver output pulse is to be utilized for subsequent computer processing, the circuitry of FIGURES 1 and 2 may be coupled to a data logger at appropriate points in the circuit to convert the required transmission information into a form suitable for further computer processing; e.g., into punched cards or on paper or magnetic tape. Of course, with a tape output, a much greater amount of information can be collected and stored as compared to a Teletype output.

In actual practice, a data logger may be connected as shown in FIGURE 1 where a coupling device 52 for integrating received signal pulses is connected to the output of signal amplifier 12. The ambient electromagnetic noise after being integrated by noise integrator 28 is coupled to the data logger through a coupler 53. Finally, the detected time length of the signal is coupled from multipath detector 30 and specifically ramp generator 37 through a coupler 54 to the data logger. Included in the couplers 52–54 is the capability of converting the received analog information to digital form.

The digital information at line 8 may also be utilized in a computer by proper conversion in a well known manner. The pulse to pulse correlation and multipath threshold output may also be utilized in the computer.

In summary, the present invention has provided an improved ionosphere sounder which converts received analog signal information to digital information which may be processed to provide a printed format that is easy to read and interpret.

I claim:

1. In a sounding system of the type including a transmitter adapted to be programmed to emit one or more pulses at each of a plurality of frequency channels in one or more predetermined frequency bands and also including a receiver for receiving pulses which have been transmitted through the atmosphere in which exists an ambient electromagnetic noise level, such received pulses having a peak amplitude, the improvement comprising means connected to said receiver serving to provide information with respect to the transmission of such pulses, such means including: means for sampling each of said frequency channels to detect the noise level associated with such channel; means for detecting in each of said frequency channels the peak amplitude of said received signal pulse; means responsive to said noise level for establishing a threshold level; means for converting the peak amplitude of said received signal pulse to a digitized output signal indicative of said peak amplitude; and means to prevent the production of said output signal if said peak amplitude is less than said threshold level.

2. A sounding system according to claim 1 in which said receiver includes means for pairing the signal output of adjacent frequency channels to produce a final output signal if a signal output is present in either frequency channel.

3. In a sounding system of the type including a transmitter adapted to be programmed to emit one or more pulses at each of a plurality of frequency channels in one or more predetermined frequency bands and also including a receiver for receiving pulses which have been transmitted through the atmosphere in which exists an ambient electromagnetic noise level, such received pulses having a time length and peak amplitude, the improvement comprising means connected to said receiver serving to provide information with respect to the transmission of such pulses, such means including: means for sampling each of said frequency channels to detect the noise level associated with such channel; means for detecting in each of said frequency channels the peak amplitude of said received signal pulse; means responsive to said noise level for establishing a threshold level; means for converting the peak amplitude of said signal to a digitized output signal indicative of the peak amplitude of said received signal, means to prevent the production of said output signal if said peak amplitude is less than said threshold level; and means for detecting the time length of said received pulse and responsive to a time length of a received pulse greater than a predetermined time length for modifying said output signal to indicate such greater time length.

4. A sounding system according to claim 3 in which said time length means includes means for compensating for momentary gaps in said received pulse.

5. A sounding system according to claim 3 in which said time length measuring means is coupled to and responsive to the ambient electromagnetic noise level for determining the minimum amplitude at which such means detects said time length.

6. A sounding system according to claim 4 in which said time length measuring means is responsive to a predetermined magnitude level below said detected peak amplitude of a received signal pulse for determining the signal amplitude at which such means detects said time length.

7. In a sounding system of the type including a transmitter adapted to be programmed to emit one or more pulses at each of a plurality of frequency channels in one or more predetermined frequency bands, each pulse being emitted in a second part of a predetermined pulse repetition period, and also including a receiver for receiving pulses which have been transmitted through the atmosphere in which exists an ambient electromagnetic noise level, such received pulses having a time length and peak amplitude, the improvement comprising means connected to said receiver serving to provide information with respect to the transmission of such pulses, such means including: means for sampling each of said frequency channels during the first part of a pulse repetition period in which a signal pulse is not present to detect the noise level associated with such channel; means for detecting in each of said frequency channels the peak amplitude of said received signal pulse during said second part of the pulse repetition period; means responsive to said noise level for establishing a threshold level; means for converting the peak amplitude of said signal to a digitized output signal indicative of the peak amplitude of said received signal; means to prevent the production of said output signal if said peak amplitude is less than said threshold level; and means for detecting the time length of said received pulse and responsive to a time length of a received pulse greater than a predetermined time length for modifying said output signal to indicate such greater time length.

References Cited

UNITED STATES PATENTS

| | | | |
|---|---|---|---|
| 2,776,365 | 1/1957 | White | 325—67 |
| 3,027,542 | 3/1962 | Silva | 340—147 |
| 3,271,679 | 9/1966 | Fostoff | 325—31 |
| 2,446,244 | 8/1948 | Richmond | 343—13 |
| 2,521,696 | 9/1950 | De Armond | 325—51 |

OTHER REFERENCES

NBS News Bulletin: vol. 37, No. 4, April 1953, pp. 60–62 relied on.

IRE Proceedings: vol. 45, No. 12, December 1957, pp. 1688–89 relied on. Montgomery et al., The Utility of Meteor Bursts.

IRE Proceedings, vol. 47, No. 2, February 1959, Peterson et al., The IGY Three Frequency Backscatter Sounder, page 303 relied on.

IRE Proceedings, vol. 49, No. 4, April 1961, Ortwein et al., Properties of Tropospheric Scattered Fields, pp. 792–794.

IRE Proceedings; vol. 50, No. 11, November 1962, Thomson et al., An Automatic Marine Seismic Monitoring and Recording Device, pp. 2211–2212 relied on.

ROBERT L. GRIFFIN, Primary Examiner

B. V. SAFOUREK, Assistant Examiner

U.S. Cl. X.R.

325—51, 65, 323; 343—175